(12) United States Patent
Finkler et al.

(10) Patent No.: US 7,482,802 B2
(45) Date of Patent: Jan. 27, 2009

(54) METHOD AND APPARATUS FOR DETERMINING THE ROTOR POSITION OF AN ELECTRIC MOTOR FROM THE ELECTRIC CURRENT AND THE ANGULAR ACCELERATION

(75) Inventors: Roland Finkler, Erlangen (DE); Hans-Georg Köpken, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 321 days.

(21) Appl. No.: 10/598,618

(22) PCT Filed: Mar. 7, 2005

(86) PCT No.: PCT/EP2005/051017

§ 371 (c)(1),
(2), (4) Date: Sep. 6, 2006

(87) PCT Pub. No.: WO2005/088826

PCT Pub. Date: Sep. 22, 2005

(65) Prior Publication Data

US 2008/0157708 A1    Jul. 3, 2008

(30) Foreign Application Priority Data

Mar. 16, 2004    (DE) ........................ 10 2004 012 805

(51) Int. Cl.
*G01B 7/30*    (2006.01)
(52) U.S. Cl. ................ 324/207.25; 318/466; 73/514.16
(58) Field of Classification Search . 324/207.2–207.25, 324/173, 174; 318/400.37, 400.07, 400.33, 318/721, 437, 467, 799, 490, 466; 702/151; 73/488, 514.16

See application file for complete search history.

(56) References Cited

U.S. PATENT DOCUMENTS

| 4,617,499 A | 10/1986 | Yuasa |
| 4,703,235 A | 10/1987 | Wisner |
| 2003/0227286 A1 | 12/2003 | Dunisch et al. |

FOREIGN PATENT DOCUMENTS

| DE | 44 39 233 A1 | 7/1995 |
| DE | 44 07 390 A1 | 9/1995 |
| DE | 44 37 793 A1 | 5/1996 |
| DE | 196 04 701 C1 | 6/1997 |
| DE | 100 24 394 A1 | 11/2001 |
| DE | 101 56 782 C1 | 4/2003 |
| EP | 0 784 378 A2 | 7/1997 |
| WO | WO 03/052919 A | 6/2003 |

OTHER PUBLICATIONS

S. Refaat et al: "Controlling the Relative Orientation between the Two Magnetic Fields of a Synchronous Motor" in Systems, Man and Cybernetics, 2001 IEEE International Conference on, Oct. 7-10, 2001, S. 3169-3174, Band 5.

*Primary Examiner*—Jay M Patidar
(74) *Attorney, Agent, or Firm*—Henry M. Feiereisen; Ursula B. Day

(57) ABSTRACT

The invention relates to a method for determining the angular position (theta) of a rotor (2) pertaining to an electric motor (1) and comprising a number of pairs of poles. Said method consists of the following steps: a pulse pattern (PM1,PM2, PM3) with a pulse duration (T) flows through at least one stator coil (7) of the electric motor (1), such that the rotor (2) does not rotate by more than 90 DEG, divided between the number of pairs of poles, during the pulse duration (T); the angular acceleration (alpha) of the rotor (2), caused by the pulse pattern flowing through the at least one stator coil, (7) is detected; and the angular position (theta) of the rotor (2) is determined by means of the correlation between the flow through the stator coil (7) and the angular acceleration (alpha) of the rotor (2).

22 Claims, 5 Drawing Sheets

METHOD AND APPARATUS FOR DETERMINING THE ROTOR POSITION OF AN ELECTRIC MOTOR FROM THE ELECTRIC CURRENT AND THE ANGULAR ACCELERATION

BACKGROUND OF THE INVENTION

The invention relates to a method and an apparatus for determination of the rotor position of an electric motor, in particular of a brushless electric motor. A method for controlling an electric motor, in which the position of a rotor relative to a stator is determined, is known, for example, from DE 44 37 793 C2. Analogously to the terminology used in this document, the terms "rotor" and "stator" in the following text refer to the functional basic elements of an electric motor which assume a variable position (rotor) or a fixed position (stator) relative a fixed coordinate system. This therefore also covers linear motors as electric motors.

In the method which is known from DE 44 37 793 C2, the relationship between a known signal which is applied to the electric motor and the movement of the rotor stimulated by this is used to determine the position of the rotor, in which case, by way of example, the change in the position of the rotor is measured by means of an incremental, optical measurement system. There is therefore no need to directly measure the rotor position by means of an absolute measurement system. However, depending inter alia on the motor geometry, not only an absolute measurement system but also an incremental measurement system can represent considerable hardware complexity. This applies in particular to hollow-shaft motors, as are used by way of example in machines which process plastic. On the other hand, in the case of the method according to DE 44 37 793 C2, the magnitude of the amplitude of the movement which is excited by the known signal that is applied often represents a disadvantage.

SUMMARY OF THE INVENTION

The invention is based on the object of specifying a method for determining the position of the rotor of an electric motor, which operates in a particularly economic manner without direct position or position-changed measurement and, in particular, excites the motor to carry out only very small movements. A further aim is specify an apparatus which is suitable for carrying out the method.

According to the invention, this object is achieved by a method for determination of the angular position of a rotor, which has a number of pole pairs, of an electric motor, with the method having the following steps current is passed through at least one stator winding of the electric motor with a pulse pattern and a pulse duration such that the rotor rotates through not more than 90° divided by the number of pole pairs during the pulse duration, the angular acceleration of the rotor produced by the current that is passed through the at least one stator winding is recorded, the angular position of the rotor is determined by means of the relationship between the current that is passed through the stator winding and the angular acceleration of the rotor. According to the invention, this object is also achieved an apparatus for determination of the angular position of a rotor, which has a number of pole pairs, of an electric motor, with the apparatus having stator windings which are intended to have a pulse pattern of a pulse duration applied to them, an acceleration sensor, which is intended to record the angular acceleration of the rotor caused by the current passing through the stator windings, an evaluation unit, which interacts with the stator windings and with the acceleration sensor, in order to carry out a method of the invention. The statements made in the context of the apparatus in the following text also apply in the same sense to the method, and vice versa. Neither an absolute measurement system nor an incremental position measurement system is required to determine the position of the rotor, but, instead of this, only an acceleration sensor. That measurement variable which indicates the acceleration of the rotor is available in the method by means of direct physical relationships, preferably by means of the eddy-current principle. A Ferraris sensor is preferably used for this purpose, as is known in principle, for example, from DE 101 56 782 C1.

The invention is intended primarily for determination of the position of the rotor during the starting of an electric motor, but may also be used for determination of positions during motor operation. In the former case, an additional measurement system is required for determination of position changes during subsequent running operation. The motor is preferably an electric motor with a permanent-magnet rotor. The rotation during the method for position determination is less than 90° divided by the number of pole pairs of the rotor. The position of the rotor while carrying out the method, that is to say during one so-called pulse duration within which at least one stator winding in the electric motor has a current pulse pattern passed through it, preferably changes by no more than 2°, and in particular by a maximum of about 1°.

In one particularly advantageous refinement, a plurality, in particular two, of mutually orthogonal components which are linearly independent of one another flow through the stator during the position-determination process. Each component of the current flow through the stator windings in this case has a specific current-flow pattern, with the totality of the current-flow patterns forming the pulse pattern. With respect to the individual components, that is to say the individual current-flow patterns, the current can flow either in the form of continuous signals, for example sinusoidal signals, or in the form of pulses which are separate from one another, for example square-wave pulses. In this context, a square-wave pulse also means a pulse which only approximately has a square-wave-form.

Passing current through the stator in the form of square-wave pulses results in the advantage that the acceleration signal that is produced can be computationally evaluated easily. The duration of each square-wave pulse is long enough to produce an acceleration signal which can be associated with this pulse and can be evaluated unambiguously, while at the same time being sufficiently short that the rotor position does not change significantly during the pulse, in particular in cases in which the rotor is stationary at the start of the position-determination process. A current-flow pattern is preferably formed from a plurality of square-wave pulses of different mathematical sign, and results in no change in the position of the rotor, or only a very small change in its position. In this case, separate acceleration measurements are carried out throughout the duration of at least one of the square-wave pulses, preferably throughout the entire duration of the current-flow pattern. A particularly small deflection of the rotor during the current-flow pulse is achieved by means of a pulse which has a central section of a first mathematical sign, directly preceded and followed by edge sections of the opposite mathematical sign. In particular, the parameters of a current-flow pulse such as this composed of three sections can be selected in a simple manner such that no permanent change in the angular position of the rotor is induced overall.

The relationship between the measured acceleration of the rotor and the angular position of the rotor cannot be determined unambiguously by considering only the reaction of the rotor to one of the linearly independent, in particular orthogonal, current-flow components. This is true subject to the precondition, which is satisfied for short current-flow durations, that the angular position of the rotor does not change significantly while a constant current pulse is being applied to the stator.

If a rotor acceleration is measured which amounts to a specific fraction of a maximum acceleration which can be achieved by the current-flow component, then it is in this way admittedly possible to determine the magnitude of the rotor angle by which it differs from that angular position at which the maximum acceleration occurs, but it is not possible to determine the mathematical sign of the difference angle in this way. In contrast, the rotor position angle can be determined unambiguously by evaluation of the various acceleration signals which are produced by the different current-flow components, that is to say components of the pulse pattern. A simple evaluation capability is achieved in particular by the stator being excited exclusively with a current-flow component, that is to say a current-flow pattern as part of the pulse pattern when the respective other current-flow component is zero or all of the other current-flow components in the pulse pattern are zero. In this case none of the individual current-flow components, which are offset in time, lead to any permanent change in the position of the rotor, or they lead only to a very small permanent change in the position of the rotor.

Both or all of the current-flow patterns within the pulse pattern preferably have the same form. The angular position of the rotor can thus be determined solely by the relationship between the acceleration signals which are produced by the various current-flow components. Physical variables which describe the relationship between the current flow and the resultant absolute value of the angular acceleration, such as the inertia of the rotating blades, can therefore be ignored in the angle calculation, in the same way, for example, as friction influences. Specific measurement factors, for example the frequency response of a Ferraris sensor that is used as the acceleration sensor, correspondingly affect the measurements of the two components, or all of the components, of the current flow in the stator in the same way. In the case of current-flow patterns, which comprise a square-wave pulse with sections of opposite mathematical sign, it is advantageous to choose the absolute values of the current in those sections to be identical.

In principle, a single pulse pattern and thus a single pulse duration is sufficient to determine the angular position of the rotor. According to one advantageous development, which can be considered in particular for continuous rotor-position determination during motor operation, but also to increase the accuracy of the rotor position determination during starting of the motor, periodic repetition of the current flow through the stator windings with the pulse pattern is provided.

BRIEF DESCRIPTION OF THE DRAWING

One exemplary embodiment of the invention will be explained in more detail in the following text with reference to a drawing, in which.

Mutually corresponding parts and parameters are annotated with the same reference symbols in all of the figures.

DETAILED DESCRIPTION OF PREFERRED EMBODIMENTS

Figure 1A:
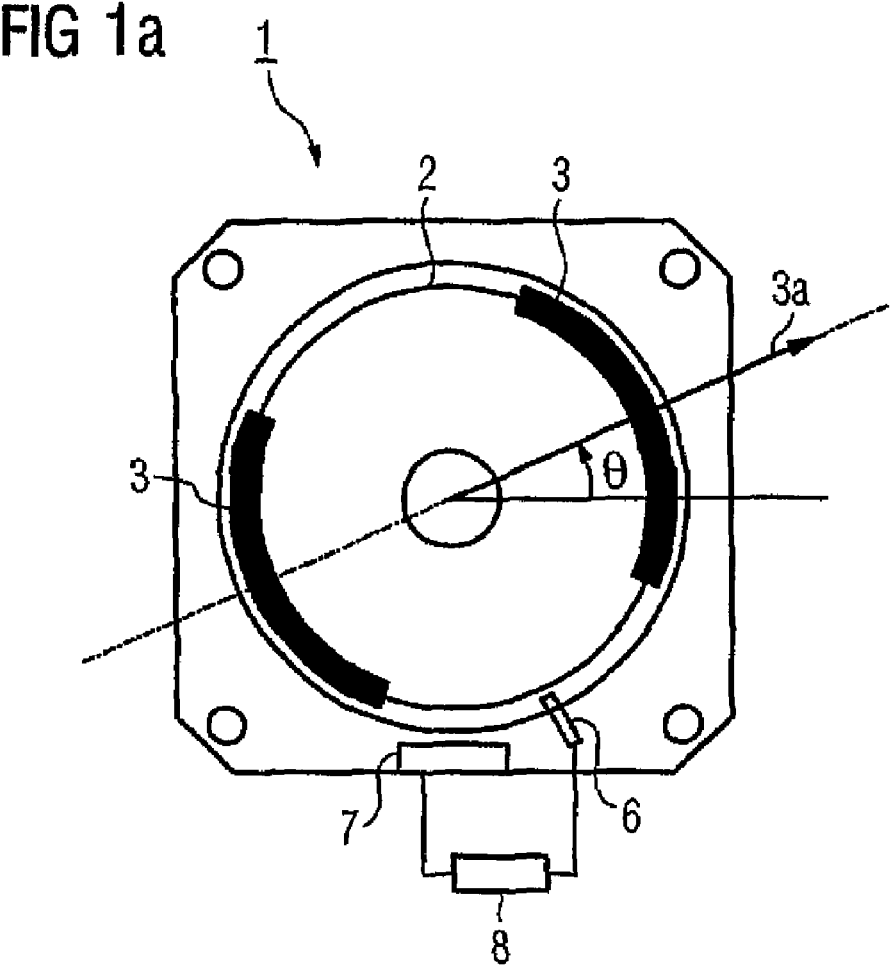
FIGS. 1a, 1b show a cross section through an electric motor, as well as an electrical equivalent circuit.

FIG. 1a shows the cross section through a two-pole synchronous motor 1 with permanent-magnet excitation, which is also referred to for short in the following text as a motor. The rotor 2 of the electric motor 1 has two permanent magnets 3 which, together, produce a field flux in the direction of the arrow 3a. The angle $\theta$ that is shown in FIG. 1a, where $-\pi \leq \theta < \pi$ in this case denotes the rotor position, that is to say the position of the rotor 2. An acceleration sensor 6, preferably a Ferraris sensor, is provided in order to measure the angular acceleration $\alpha$; that is to say the second derivative with respect to time of the rotor position. An evaluation unit 8 interacts with the acceleration sensor 6, which is indicated only schematically, and with the stator windings 7, which are likewise indicated only by way of example in FIG. 1a, and (as will be explained in more detail in the following text with reference to FIGS. 3 to 5) firstly produces defined current pulses in order to induce an angular acceleration $\alpha$ of the rotor 2, secondly calculates the signal coming from the acceleration sensor 6 with these current pulses, and, thirdly, determines the rotor position $\theta$ from this. The stator windings 7 are used primarily for current to be passed through the motor 1 during normal operation, that is to say in order to produce drive power. The current flow according to the invention with the pulse patterns that will be explained in the following text is additively superimposed, or is carried out once before the conventional motor current flow.

Figure 1B:
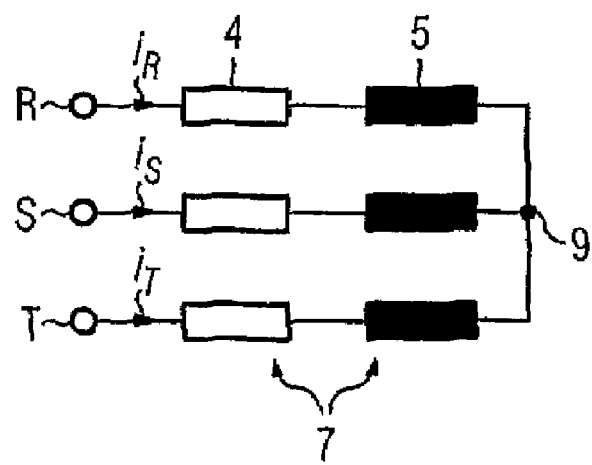

FIG. 1b shows the electrical equivalent circuit of the motor 1 with three connecting terminals R, S, T, and with the motor currents $i_R$, $i_S$, $i_T$ flowing through them. The stator windings 7 of the motor 1 are each represented in FIG. 1b by a resistance 4 and a inductance 5. As can be seen from FIG. 1b, the circuit is a system with two degrees of freedom, on the basis of a node 9 which connects the connecting terminals R, S, T via the resistances 4 and inductances 5.

The current flow through the motor 1 must be selected to match the rotor position $\theta$ in order to achieve the maximum torque output from the motor 1, that is to say the maximum torque M for a predetermined $(i_R^2 + i_S^2 + i_T^2)^{1/2}$. If the current flow through the motor 1 is not optimally matched to the rotor position $\theta$ in this sense, but corresponds to an angle $\theta - \epsilon$ other than this (where $\epsilon < \theta$), then this results in a torque which is reduced by the factor $\cos \epsilon$. This factor can now be used to determine the angular position $\theta$ of the rotor 2 by passing current through the motor 1 deliberately inappropriately for the rotor position $\theta$ at times, in the manner which is explained in more detail in the following text, and by an analyzing the resultant torque M. In this case, the torque M is not measured directly, but the angular acceleration $\alpha$ of the rotor 2, which is at least approximately proportional to it.

When the motor currents $i_R$, $i_S$, $i_T$ flow through the motor 1, it produces a torque M which is dependent on the motor currents $i_R$, $i_S$, $i_T$ and on the rotor position $\theta$. The torque M acting on the rotor 2 in turn leads to angular acceleration $\alpha$ of the rotor 2, which, subject to the simplifying assumption that this is a constant self-torque or load-inertia torque, and that there are no disturbance torques or friction torques, is proportional to the torque M. If the sum of the self-torque and load-inertia torque is J, then:

$$\alpha = M/J. \quad (40)$$

According to the invention, current is now passed through the motor 1 in such a way that the rotor position $\theta$ can be deduced by comparison of the motor current flow $i_R$, $i_S$, $i_T$ and the resultant angular acceleration $\alpha$. The angular position $\theta$ of the rotor 2 is then obtained by suitable calculation of the angular acceleration $\alpha$, as measured by the acceleration sensor 6, with the motor current flow $i_R$, $i_S$, $i_T$.

The relationships between the variables $i_R$, $i_S$, $i_T$, $\theta$ mentioned above, and the method according to the invention, will be explained in more detail in the following text:

On the basis of the node 9 which connects the motor currents $i_R$, $i_S$, $i_T$:

$$i_R + i_S + i_T = 0. \quad (50)$$

The motor currents $i_R$, $i_S$, $i_T$ can thus also be represented by two orthogonal components $$i_\alpha = (2/3)i_R + (-1/3)i_S + (-1/3)i_T \quad (60a)$$

$$i_\beta = i_R + (1/3^{1/2})i_S + (-1/3^{1/2})i_T \quad (60b)$$

If, conversely, the motor currents $i_R$, $i_S$, $i_T$ are represented by the orthogonal components $i_\alpha$, $i_\beta$, then this results in:

$$i_R = i_\alpha \quad (70a)$$

$$i_S = (-1/2)i_\alpha + (3^{1/2}/2)i_\beta \quad (70b)$$

$$i_T = (-1/2)i_\alpha + (-3^{1/2}/2)i_\beta \quad (70c)$$

These components of the currents are referred to as being stator-fixed. The following components are obtained by rotation of the orthogonal components $i_\alpha$, $i_\beta$ through an angle $\theta_x$:

$$i_x(\theta_x) = (\cos\theta_x)i_\alpha + (\sin\theta_x)i_\beta \quad (80a)$$

$$i_y(\theta_x) = (-\sin\theta_x)i_\alpha + (\cos\theta_x)i_\beta \quad (80b)$$

If the angle $\theta_x$ is constant, these components $i_x$, $i_y$ are likewise stator-fixed. If, in contrast, the angle $\theta_x$ is made equal to the rotor position $\theta$, which in general varies with time, then this results in the rotor-fixed coordinates:

$$i_q = i_x(\theta) = (\cos\theta)i_\alpha + (\sin\theta)i_\beta \quad (90a)$$

$$i_d = i_y(\theta) = (-\sin\theta)i_\alpha + (\cos\theta)i_\beta \quad (90b)$$

Figure 2:
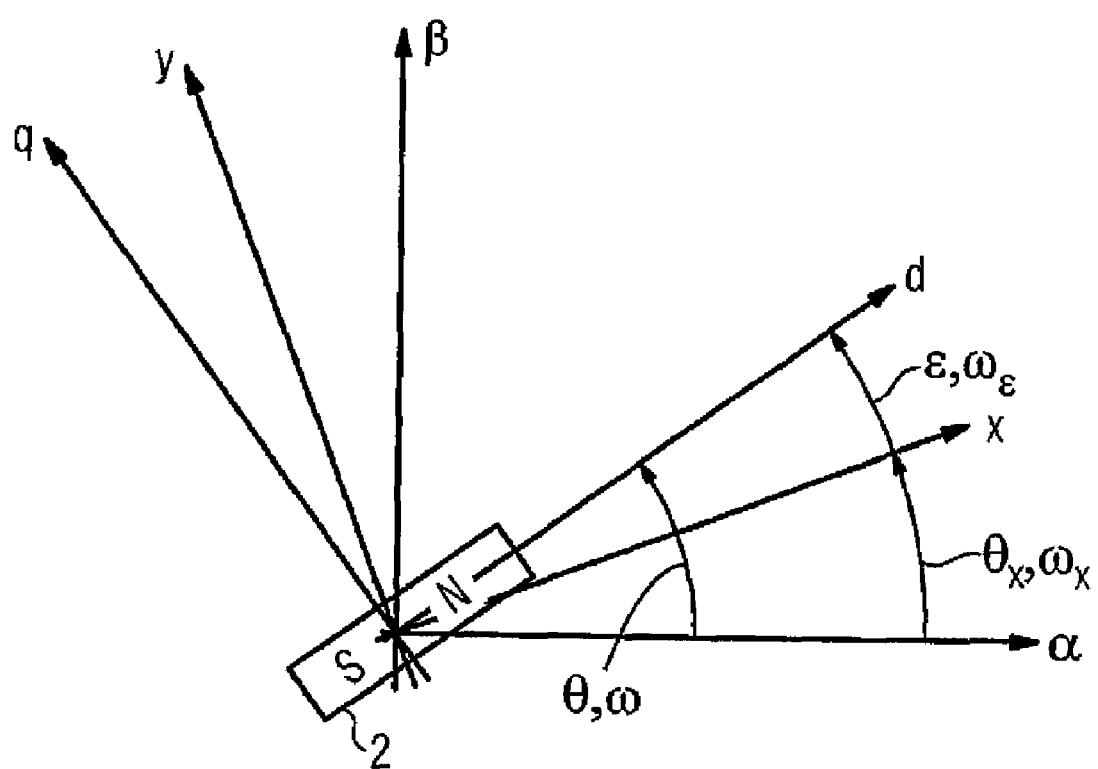
FIG. 2 shows various coordinate systems which are used to represent the current flow through the electric motor.

FIG. 2 shows the relationship between the coordinates $\alpha$, $\beta$, x, y, q, d which are used for representation of the motor current flow, with rotor 2 of the motor 1 being symbolized as a bar magnet, and $\omega$ denoting the angular velocity.

The relationship between the motor current flow and the torque M that is produced or angular acceleration $\alpha$ that is produced can be formulated very easily by using the rotor-fixed coordinates $i_q$, $i_d$: the torque M is simply proportional to the component $i_q = i_x(\theta)$, while $i_d = i_y(\theta)$ produces no torque. The torque M and the angular acceleration $\alpha$ of the rotor 2 are obtained from equation (40) as follows:

$$M = K_M i_q; \quad \alpha = (K_M/J)i_q \quad (100)$$

where $$K_M > 0 \quad (105)$$

denotes a proportionality constant.

Since the rotor-fixed component $i_d$ of the current flow does not produce any torque M, the aim is to pass current through the motor 1 in such a way that $i_d = 0$. The rotor position $\theta$ must generally be known for this purpose for a current flow with defined rotor-fixed coordinates $i_q$, $i_d$. In order to determine the rotor position $\theta$, current is passed through the stator windings 7 of the motor 1 using defined pulse patterns PM1, PM2 or PM3, which each have a current-flow pattern $BM_{1x}$, $BM_{1y}$, $BM_{2x}$, $BM_{2y}$, $BM_{3x}$, $BM_{3y}$ in each of the components $i_x$, $i_y$, as will be explained in more detail on the basis of the following examples. According to one basic principle for the determination of the rotor position $\theta$, current is passed through the motor 1 for a short time interval $$t_0 \leq t < t_0 + T_1$$

where $$i_x(\theta_x) = I_0, \quad i_y(\theta_x) = 0 \quad (120)$$

where $T_1$ is assumed to be sufficiently short that the rotor position $\theta$ does not in practice change during this time interval. Solving (80a, b) on the basis of $i_\alpha$, $i_\beta$, and substitution of the result in (90a, b) results in:

$$i_q = [\cos(\theta-\theta_x)]i_x(\theta_x) + [\sin(\theta-\theta_x)]i_y(\theta_x) \quad (130a)$$

$$i_d = [-\sin(\theta-\theta_x)]i_x(\theta_x) + [\cos(\theta-\theta_x)]i_y(\theta_x) \quad (130b)$$

It thus follows from (120) and (100) that:

$$\alpha = [\cos(\theta-\theta_x)](K_M/J)I_0 \quad (140)$$

By solving for the angle, this results firstly in $$\theta - \theta_x = \pm \arccos(\alpha J/(K_M I_0)) + 2k\pi \quad (150)$$

and $$\theta = \mathrm{mod}(\theta_x \pm \arccos(\alpha J/(K_M I_0)), 2\pi), \quad (160)$$

where arc cos denotes the main value of the arc cosine, k is an integer and mod is the modulo function, that is to say mod(x, y) is the remainder from the division of x by y. In this case, using (160) to determine the rotor position $\theta$ still has two disadvantages:

Firstly, the ratio between the proportionality constant $K_M$ and the sum, which is denoted J, of the self-torques and load-inertia torques of the rotor 2 must be known.

Secondly, the mathematical sign of the difference between the angles $\theta$ and $\theta_x$, that is to say the difference between the actual angular position of the rotor 2 and that angular position of the rotor 2 which would result in the maximum torque M acting on the rotor 2 with the given current flow, cannot be determined.

These disadvantages are overcome by the method described in the following text.

Figure 3:
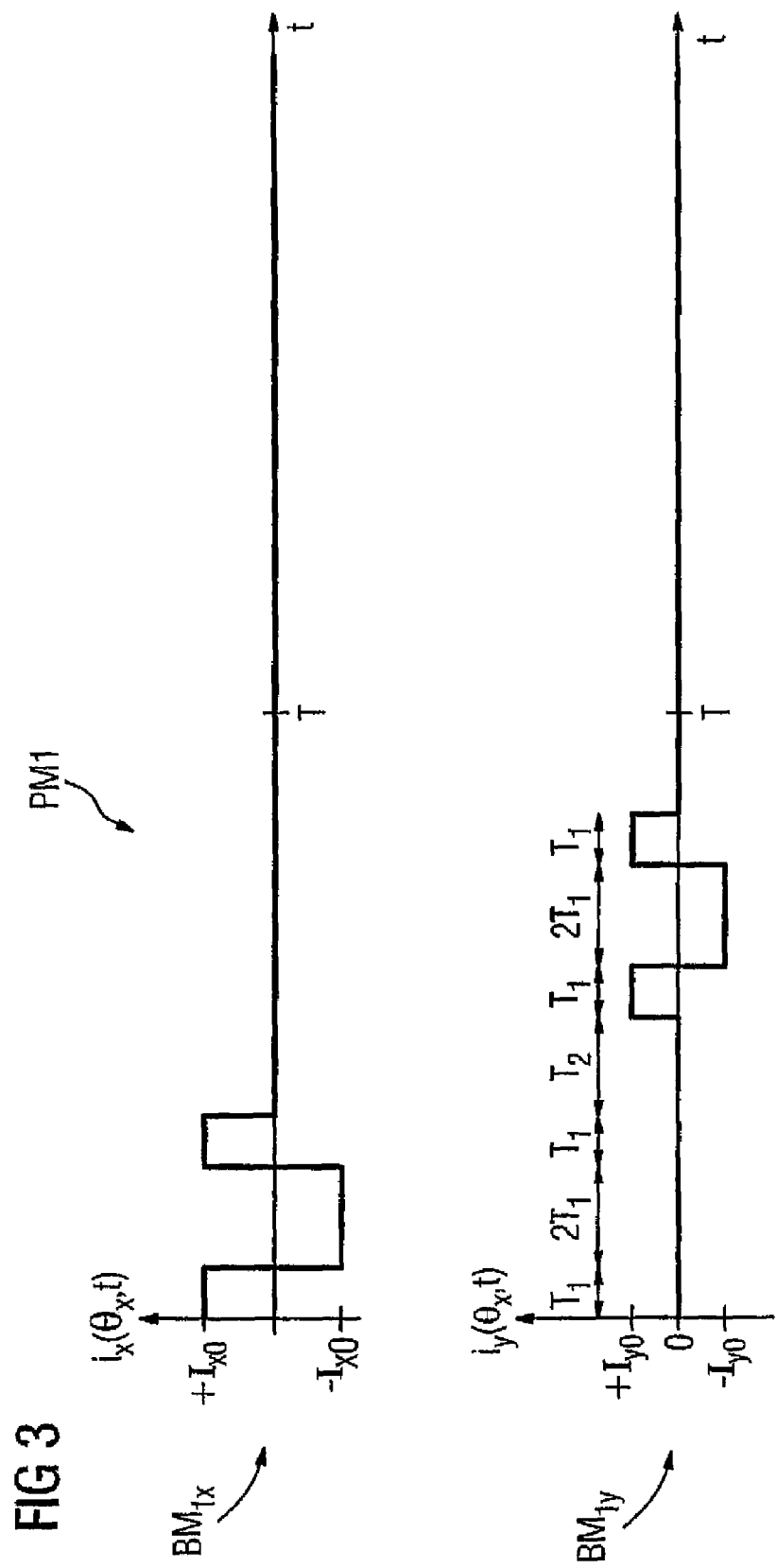
FIG. 3 shows a first example of a current flow through the electric motor.

In order to determine the rotor position $\theta$ when the rotor 2 is stationary at the time t=0, the motor 1 as shown in FIG. 3 has a pulse pattern PM1 passed through it, which is composed of a current-flow pattern $BM_{1x}$ of the component $i_x$ and a current-flow pattern $BM_{1y}$ of the component $i_y$:

$$\begin{aligned} i_x(\theta_x, t) &= I_{x0} & \text{for} \quad 0 \leq t < T_1 \\ &= -I_{x0} & \text{for} \quad T_1 \leq t < 3T_1 \\ &= I_{x0} & \text{for} \quad 3T_1 \leq t < 4T_1 \\ &= 0 & \text{else} \end{aligned} \quad (162a)$$

-continued $$i_y(\theta_x, t) = I_{y0} \quad \text{for} \quad 4T_1 + T_2 \leq t < 5T_1 + T_2 \quad (162b)$$
$$= -I_{y0} \quad \text{for} \quad 5T_1 + T_2 \leq t < 7T_1 + T_2$$
$$= I_{y0} \quad \text{for} \quad 7T_1 + T_2 \leq t < 8T_1 + T_2$$
$$= 0 \quad \text{else}$$

In this case:

$$T_1 K_M I_{x0}/J \text{ and } T_1 K_M I_{y0}/J \text{ are sufficiently small,} \quad (163a)$$

so that, during the current-flow phases:

$$0 \leq t < 4T_1 (i_x(\theta_x, t) \neq 0), \quad (163b)$$

$$4T_1 + T_2 \leq t < 8T_1 + T_2 (i_y(\theta_x, t) \neq 0), \quad (163c)$$

the rotor position θ changes only insignificantly, and the angular acceleration α is thus in each case proportional to the current $i_x(\theta_x, t)$ or $i_y(\theta_x, t)$, respectively. The current flow (162a, b) is thus chosen such that the rotor position (which is obtained by double integration from the acceleration) is changed only temporarily during the current-flow phases by this current flow, but otherwise remains unchanged, that is to say:

$$\theta(t) = \theta(0) \text{ for } 4T_1 \leq t \leq 4T_1 + T_2, \quad (164a)$$

$$\theta(t) = \theta(0) \text{ for } 8T_1 + T_2 \leq t. \quad (164b)$$

The pulse duration T of the pulse pattern PM1 is given by $8T_1 + T_2$. The time period of each component $i_x(\theta_x, t)$ $i_y(\theta_x, t)$, in which the respective signal is not zero is referred to as the current-flow phase, and the rest of the time is referred to as the phase with no current flow. As can be seen from FIG. 3 and from the equations (162a, b), the current-flow phase of one of the components $i_x$, $i_y$ falls into a phase with no current flow for the other component $i_y$, $i_x$.

Thus, overall, the current flow (162a, b) results, according to (130a, b), (100), in the angular acceleration:

$$\alpha(t) = (K_M I_{x0}/J) \cos(\theta - \theta_x) \quad \text{for } 0 \leq t < T_1 \quad (165)$$
$$= -(K_M I_{x0}/J) \cos(\theta - \theta_x) \quad \text{for } T_1 \leq t < 3T_1$$
$$= (K_M I_{x0}/J) \cos(\theta - \theta_x) \quad \text{for } 3T_1 \leq t < 4T_1$$
$$= (K_M I_{y0}/J) \sin(\theta - \theta_x) \quad \text{for } 4T_1 + T_2 \leq t < 5T_1 + T_2$$
$$= -(K_M I_{y0}/J) \sin(\theta - \theta_x) \quad \text{for } 5T_1 + T_2 \leq t < 7T_1 + T_2$$
$$= (K_M I_{y0}/J) \sin(\theta - \theta_x) \quad \text{for } 7T_1 + T_2 \leq t < 8T_1 + T_2$$
$$= 0 \quad \text{else,}$$

Firstly, this results in the following relationships:

$$\cos(\theta - \theta_x) = (J/K_M) \alpha(t_x)/I_{x0},$$

$$\sin(\theta - \theta_x) = (J/K_M) \alpha(t_y)/I_{y0}, \quad (166a)$$

where in this case $t_x$, $t_y$ denote non-specific times in the range $$0 \leq t_x \leq T_1 \text{ or } 3T_1 \leq t_x \leq 4T_1 \text{ or} \quad (166b)$$

$$4T_1 + T_2 \leq t_y \leq 5T_1 + T_2 \text{ or}$$

$$7T_1 + T_2 \leq t_y \leq 8T_1 + T_2. \quad (166c)$$

On the basis of (105), the sought rotor position θ(0) can thus be determined as follows:

$$\theta(0) = \theta_x + a \tan 2(\alpha(t_y)/I_{y0}, \alpha(t_x)/I_{x0}); \quad (166d)$$

where in this case a tan 2(y, x) means the argument of the complex number x+jy, where j represents the imaginary unit ($j^2 = -1$). For practical use of this formula, however, it should be remembered that the relationships relating to the current flow in (165) are generally valid only approximately, averaged over time. In this case, it is more appropriate to determine the rotor position θ using the formulae:

$$\theta(0) = \theta_x + a \tan 2(c_{\alpha\,iy}/c_{iy\,iy}, c_{\alpha\,ix}/c_{ix\,ix}); \quad (167a)$$

where $$c_{\alpha\,ix} = \int_{0 \leq t \leq T} \alpha(t) i_x(\theta_x, t) dt,$$

$$c_{\alpha\,iy} = \int_{0 \leq t \leq T} \alpha(t) i_y(\theta_x, t) dt, \quad (167b, c)$$

$$c_{ixix} = \int_{0 \leq t \leq T} [i_x(\theta_x, t)]^2 dt,$$

$$c_{iyiy} = \int_{0 \leq t \leq T} [i_y(\theta_x, t)]^2 dt. \quad (167d, e)$$

where $$T = 8T_1 + 2T_2 \quad (168)$$

The rotor position θ can be determined not only at the start, during starting of the motor 1, but continuously during operation, in various ways. In general, for this purpose, the current flow which is required for actual operation:

$$i_{x\,nom}(\theta_x, t), i_{y\,nom}(\theta_x, t) \quad (169a)$$

must also have a test current flow $$i_{x\,test}(\theta_x, t), i_{y\,test}(\theta_x, t) \quad (169b)$$

superimposed on it, that is to say the current flow must be:

$$i_x(\theta_x, t) = i_{x\,nom}(\theta_x, t) + i_{x\,test}(\theta_x, t), \quad (169c)$$

$$i_y(\theta_x, t) = i_{y\,nom}(\theta_x, t) + i_{y\,test}(\theta_x, t). \quad (169d)$$

Figure 4:
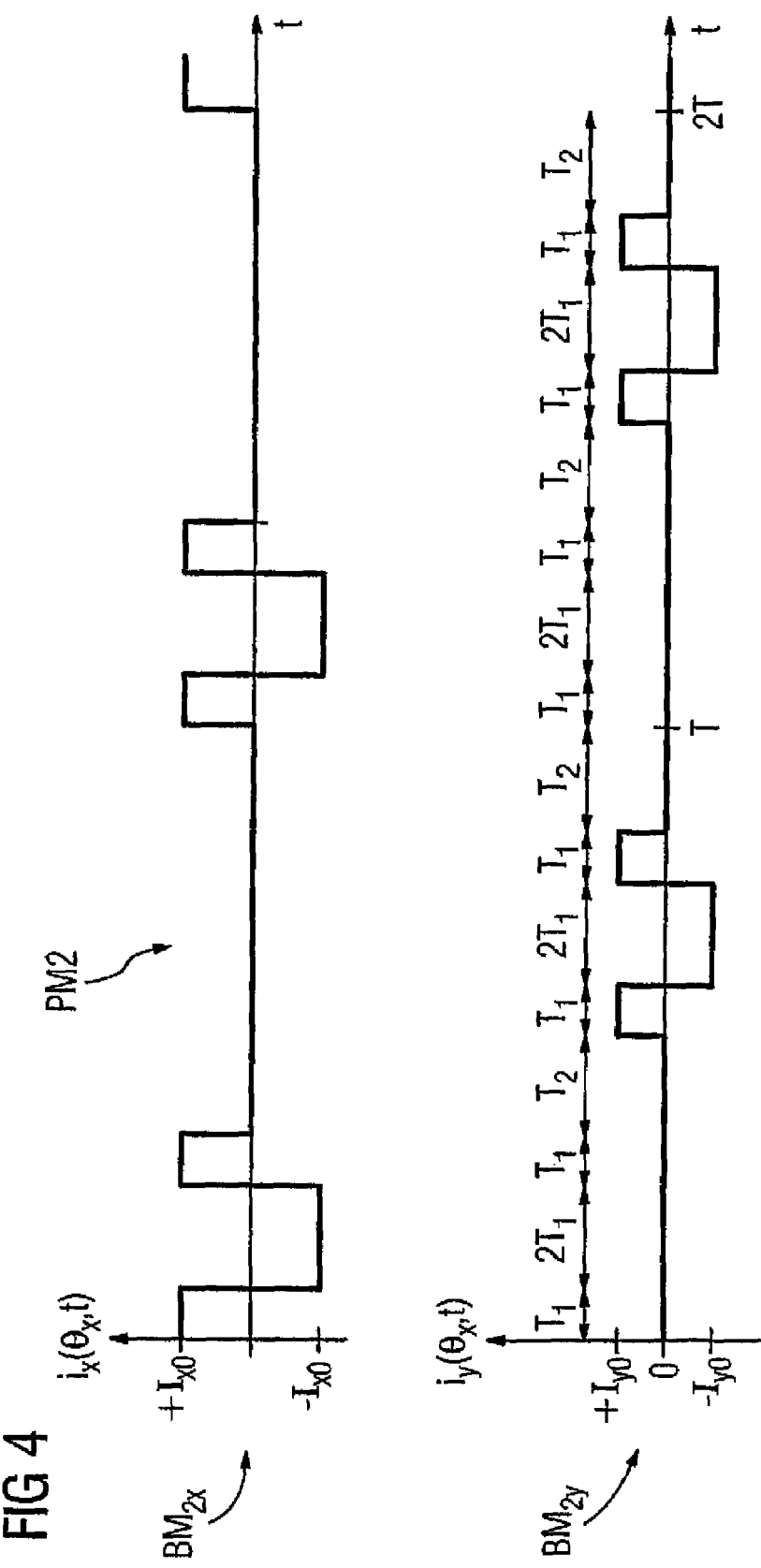
FIG. 4 shows a second example of a current flow through the electric motor.

There are a number of options for these pulse patterns PM, which are referred to here as the test current flow $i_{x\,test}(\theta_x, t)$, $i_{y\,test}(\theta_x, t)$:

A first option for a suitable test current flow is obtained, for example, from the periodic continuation of (162a, b) for t>0, as is shown by the pulse pattern PM2, which is composed of current-flow patterns $BM_{2x}$, $BM_{2y}$, in FIG. 4:

$$i_{xtest}(\theta_x, t) = I_{x0} \quad \text{for} \quad nT \leq t < nT + T_3 \quad (170a)$$
$$= -I_{x0} \quad \text{for} \quad nT + T_1 \leq t < nT + 3T_1$$
$$= I_{x0} \quad \text{for} \quad nT + 3T_1 \leq t < nT + 4T_1$$
$$= 0 \quad \text{else}$$

$$i_{ytest}(\theta_x, t) = I_{x0} \quad \text{for} \quad nT + 4T_1 \leq t < nT + 5T_1 \quad (170b)$$
$$= -I_{x0} \quad \text{for} \quad nT + 5T_1 \leq t < nT + 7T_1$$
$$= I_{x0} \quad \text{for} \quad nT + 7T_1 \leq t < nT + 8T_1$$
$$= 0 \quad \text{else,}$$

$$n = 0, 1, 2, \ldots \quad (170c)$$

with T as per (168).

On the assumption that the rotor position θ changes only insignificantly within the time interval $nT \leq t \leq (n+1)T$; n=0, 1, 2 . . . then, on the basis of (90a, b), (100), the resultant additional acceleration is:

$$\alpha_{test}(t) := \alpha(t) - \alpha_{nom}(t) = (K_M I_{x0}/J)\cos(\theta - \theta_x)$$ (180)

$$\text{for} = nT \leq t < nT + T_1$$

$$= -(K_M I_{x0}/J)\cos(\theta - \theta_x)$$

$$\text{for} = nT + T_1 \leq t < nT + 3T_1$$

$$= (K_M I_{x0}/J)\cos(\theta - \theta_x)$$

$$\text{for} = nT + 3T_1 \leq t < nT + 4T_1$$

$$= (K_M I_{y0}/J)\sin(\theta - \theta_x)$$

$$\text{for} = nT + 4T_1 \leq t < nT + 5T_1$$

$$= -(K_M I_{y0}/J)\sin(\theta - \theta_x)$$

$$\text{for} = nT + 5T_1 \leq t < nT + 7T_1$$

$$= (K_M I_{y0}/J)\sin(\theta - \theta_x)$$

$$\text{for} = nT + 7T_1 \leq t < nT + 8T_1$$

$$= 0 \text{ else,}$$

where $\alpha_{nom}(t)$ represents the acceleration expected on the basis of the current flow $$i_{x\,nom}(\theta_x,t)i_{t\,soll}(\theta_x,t)$$

required for actual operation, and can thus be assumed to be known.

From (180), this results firstly in:

$$\cos(\theta-\theta_x)=(J/K_M)\alpha_{test}(t_x)/I_{x0},\ \sin(\theta-\theta_x)=(J/K_M)\alpha_{test}(t_y)/I_{y0};$$ (190a)

where $t_x$, $t_y$ denote undefined times in the range $$nT \leq t_x \leq nT+T_1 \text{ or } nT+3T_1 \leq t_x \leq nT+4T_1$$ (190b)

or $$nT+4T_1+T_2 \leq t_y \leq nT+5T_1+T_2 \text{ or}$$

$$nT+7T_1+T_2 \leq t_y \leq nT+8T_1+T_2$$ (190c)

$\theta(nT)$ can thus be determined at this stage as follows:

$$\theta(nT)=\theta_x+a\tan 2([\alpha(t_y)-\theta_{nom}(t_y)]/I_{y0},$$

$$[\alpha(t_x)-\alpha_{soll}(t_x)]/I_{x0}.$$ (190d)

However, for practical use of this formula, it should be remembered that relationships relating to the current flow according to (180) are in generally valid only approximately, averaged over time.

In this case, it is more suitable to determine the rotor position $\theta$ in the time interval $nT\leq t\leq(n+1)T$ using the formula:

$$\theta(nT)=\theta_x+a\tan 2(c_{\alpha\,iy}/c_{iy\,iy},c_{\alpha\,ix}/c_{ix\,ix});$$ (200a)

where $$c_{\alpha\,ix}=\int_{n\,T\leq t\leq(n+1)T}[\alpha(t)-\alpha_{nom}(t)]i_{x\,test}(\theta_x,t)dt,$$

$$c_{\alpha\,iy}=\int_{n\,T\leq t\leq(n+1)T}[\alpha(t)-\alpha_{nom}(t)]i_{y\,test}(\theta_x,t)dt,$$ (200b, c)

$$c_{ixix}=\int_{n\,T\leq t\leq(n+1)T}[i_{x\,test}(\theta_x,t)]^2 dt,$$

$$c_{iyiy}=\int_{n\,T\leq t\leq(n+1)T}[i_{y\,test}(\theta_x,t)]^2 dt.$$ (200d,e)

So far, the assumption has been made, and action has been carried out on the basis of the assumption, that the rotor position $\theta$ changes only insignificantly within the time intervals $nT\leq t\leq(n+1)T=0$. There is no need for this assumption if, for example, the actually desired motion profile $$\theta_{nom}(t)$$

is also taken into account. If the modified current flow is then superimposed instead of (170a-c):

$$i_{x\,test}(\theta_x+\theta_{nom}(t)-\theta_{nom}(nt),t)=I_{x0}$$

for $nT\leq t<nT+T_1=-I_{x0}$ for $nT+T_1\leq t<nT+3T_1=I_{x0}$ for $nT+3T_1\leq t<nT+4T_1=0$ else (220a)

$$i_{y\,test}(\theta_x+\theta_{nom}(t)-\theta_{nom}(nt),t)=I_{y0}$$

for $nT+4T_1\leq t<nT+5T_1=-I_{y0}$ for $nT+5T_1\leq t<nT+7T_1=I_{y0}$ for $nT+7T_1\leq t<nT+8T_1=0$ else (220b)

n=0, 1, 2, . . . (220c)

where T is based on (168), so that (190d) and (200a-e) are valid for this purpose in the same way.

Instead of the desired motion profile, an estimated position profile for the rotor 2 can also be used for $\theta_{nom}(t)$. Good options for estimation of the position profile are described, for example, in DE 44 39 233 A1 and in DE 100 24 394 A1.

A further possibility for a suitable test current flow, that is to say for a pulse pattern PM3 which has a current-flow pattern $BM_{3x}$, $BM_{3y}$, will be described in the following text with reference to FIG. 5: instead of the current based on (170a-c) and FIG. 4 or (220a-c), the current is in this case passed through the motor 1 as follows, with $I_{x0}$ and $I_{y0}$ denoting the maximum currents:

$$i_{xtest}(\theta_x, t) = I_{x0} \quad \text{for} \quad nT \leq t < nT + T/8$$ (240a)

$$= -I_{x0} \quad \text{for} \quad nT + T/8 \leq t < nT + 3T/8$$

$$= I_{x0} \quad \text{for} \quad nT + 3T/8 \leq t < nT + 5T/8$$

$$= -I_{x0} \quad \text{for} \quad nT + 5T/8 \leq t < nT + 7T/8$$

$$= I_{x0} \quad \text{for} \quad nT + 7T/8 \leq t < nT + T + T$$

$$= 0 \quad \text{else}$$

$$i_{ytest}(\theta_x, t) = I_{y0} \quad \text{for} \quad nT \leq t < nT + T/4$$ (240b)

$$= -I_{y0} \quad \text{for} \quad nT + T/4 \leq t < nT + 3T/4$$

$$= I_{y0} \quad \text{for} \quad nT + 3T/4 \leq t < nT + T$$

$$= 0 \quad \text{else,}$$

n = 0, 1, 2, ... (240c)

or $$i_{xtest}(\theta_x + \theta_{nom}(t) - \theta_{nom}(n, T), t) \quad = I_{x0}$$ (245a)

for $nT \leq t < nT + T/8 \quad = -I_{x0}$ for $nT + T/8 \leq t < nT + 3T/8 \quad = I_{x0}$ for $nT + 3T/8 \leq t < nT + 5T/8 \quad = -I_{x0}$ for $nT + 5T/8 \leq t < nT + 7T/8 \quad = I_{x0}$ for $nT + 7T/8 \leq t < nT + T \quad = 0$ else -continued $$i_{y\,test}(\theta_x + \theta_{nom}(t) - \theta_{nom}(nT), t) = I_{y0} \quad (245b)$$

for $nT \leq t < nT + T/4$ $\quad = I_{y0}$
for $nT + T/4 \leq t < nT = 3T/4$ $\quad = -I_{y0}$
for $nT + 3T/4 \leq t < nT + T$ $\quad = 0$
else, $$n = 0, 1, 2, \ldots \quad (245c)$$

In this case as well, $\theta_{nom}(t)$ denotes the desired motion profile or an estimated position profile of the rotor 2. In this context, reference is likewise made to DE 44 39 233 A1 and DE 100 24 394 A1.

In this case, it is no longer possible to calculate the rotor position on the basis of (190d), or even on the basis of (200a-e). In this case, T must be chosen such that the frequency 2/T is negligible in comparison to any cut-off frequency (see DE 44 39 233 A1, page 7, lines 39-51) of the acceleration measurement system.

Figure 5:
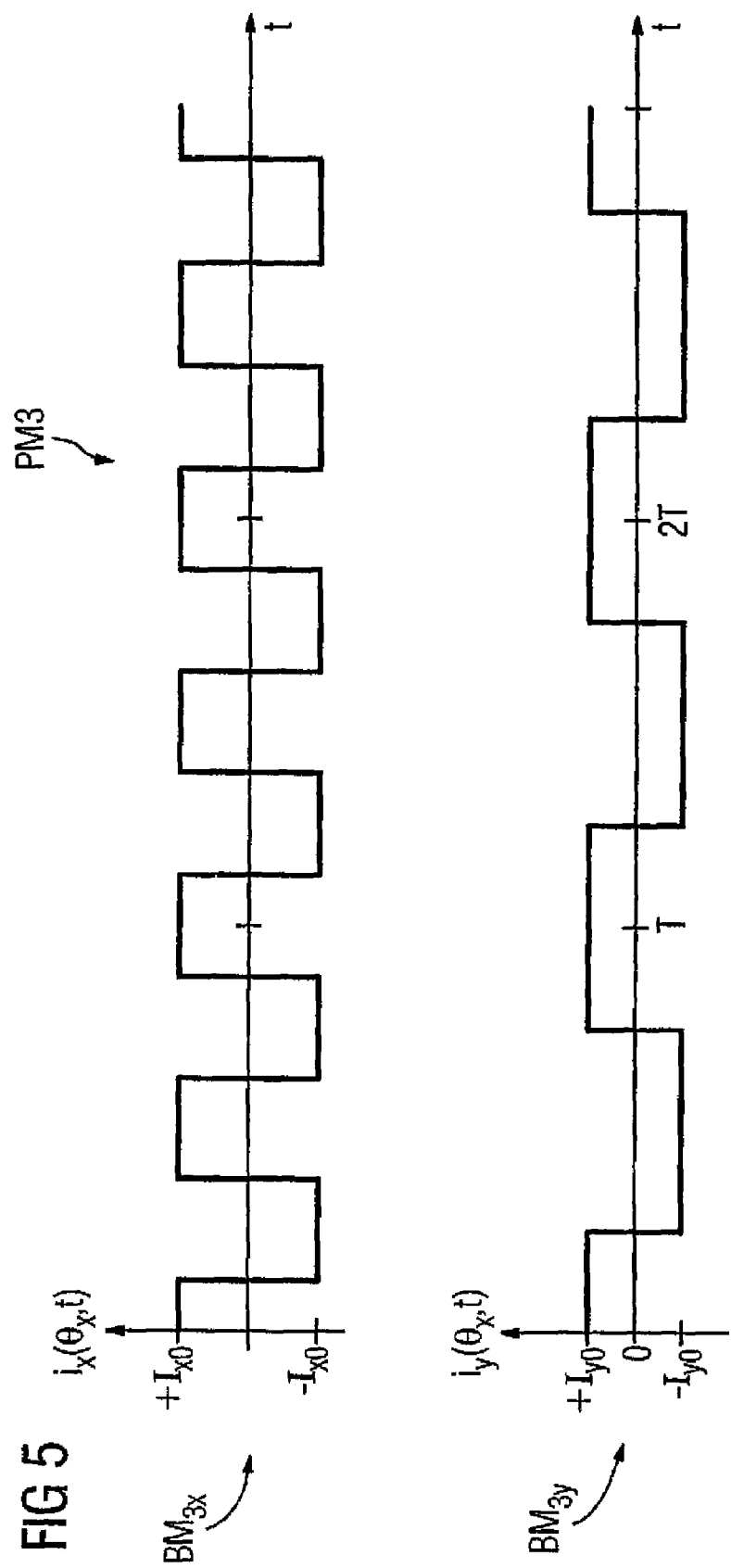
FIG. 5 shows a third example of a current flow through the electric motor.

For the purposes of frequency-division multiplexing and contrary to the abovementioned exemplary embodiments, sinusoidal current profiles can also be used instead of a square-wave current profile on the basis of (240a-c) and FIG. 5 or (245a-c):

$$i_{x\,test}(\theta_x, t) = I_{x0} \cos(2\pi f_x t) \text{ for } t > 0 \quad (250a)$$

$$i_{y\,test}(\theta_x, t) = I_{y0} \cos(2\pi f_y t) \text{ for } t > 0 \quad (250b)$$

or $$i_{x\,test}(\theta_x + \theta_{nom}(t), t) = I_{x0} \cos(2\pi f_x t) \text{ for } t > 0 \quad (260a)$$

$$i_{y\,test}(\theta_x + \theta_{nom}(t), t) = I_{y0} \cos(2\pi f_y t) \text{ for } t > 0 \quad (260b)$$

This based on the assumption that the desired motion profile $\theta_{nom}(t)$ changes only slowly over time in comparison to the cosine functions $\cos(2\pi f_x t)$, $\cos(2\pi f_y t)$.

However, the rotor position $\theta$ is no longer determined on the basis of (200a-e), but by the application of relevant demodulation methods to the measured acceleration signal. Demodulation methods such as these are known, for example, from information technology. This results in the signals:

$$A_x(t), A_y(t), \quad (270)$$

which vary only slowly over time in comparison to $\cos(2\pi f_x t)$, $\cos(2\pi f_y t)$, and for which, approximately:

$$\alpha(t) = A_x(t)\cos(2\pi f_x t) + A_y(t)\cos(2\pi f_y t). \quad (280)$$

The desired profile of the rotor position $\theta$ is obtained from these signals using:

$$\theta(t) = \theta_x + a\tan 2(A_y(t)/I_{y0}, A_x(t)/I_{x0}) \quad (290)$$

or $$\theta(t) = \theta_x + \theta_{nom}(x) + a\tan 2(A_y(t)/I_{y0}, A_x(t)/I_{x0}) \quad (300)$$

If the frequencies $f_x$, $f_y$ are in this case no longer negligible in comparison to any cut-off frequency (see DE 44 39 233 A1, page 7, lines 39-51), the above method must be modified as described in the following text:

In this situation, the output signal $U_\alpha(t)$ is not directionally proportional to $\alpha(t)$, but, rather than this:

$$U_\alpha(t) = U_x(t)\cos(2\pi f_x t + \phi_x) + U_y(t)\cos(2\pi f_y t + \phi_y) \quad (310a)$$

where $$U_x(t) = A_x(t)|H(j2\pi f_x)|, \phi_x = \arg(H(j2\pi f_x)), \quad (310b, c)$$

$$U_y(t) = A_y(t)|H(j2\pi f_y)|, \phi_y = \arg(H(j2\pi f_y)), \quad (310d, e)$$

where H is the transfer function of the acceleration measurement system and arg(z) is the argument of the complex number z. In consequence, the signals $A_x(t)$, $A_y(t)$ can be determined using:

$$A_x(t) = U_x(t)/|H(j2\pi f_x)|, A_y(t) = U_y(t)/|H(j2\pi f_y)| \quad (320a, b)$$

and the rotor position can thus be calculated using (290) and (300).

According to (180), the current flow as described so far through the motor 1 in general leads to an additional "vibration-like" rotary movement, which is superimposed on the actually desired rotary movement of the rotor 2. This is not disadvantageous if $I_{x0}$, $I_{y0}$ are sufficiently small. A further reduction in this additionally superimposed rotary movement, that is to say test movement, can advantageously be achieved by selecting $$I_{x0} = 0 \quad (330a)$$

and attempting to approximate:

$$\theta_x = \theta \quad (330b).$$

In this case, however, the rotor position $\theta$ can no longer be determined using (190d) or (200a-e) (for pulse pattern PM2 or PM3), or (290) or (300) (for "frequency-division multiplex" based on (260a, b) or (260a, b) respectively), because in this case it would be necessary to evaluate undefined expressions of the type 0/0. However, in this case, a control loop can be used to readjust $\theta_x$ such that the variable $c_{\alpha\,iy}$ according to (200c) (for pulse patterns PM2 or PM3) or the signal $A_y(t)$ according to (280) or $U_y(t)$ according to (310a) for "frequency-division multiplex" based on (250a, b) or (260a, b) respectively) is regulated to be zero. The rotor position $\theta$ is then obtained from (330b).

The method according to the invention, which has been described above for rotating electric motors, can also be used analogously for linear motors. In this case as well, the method makes it possible particularly during a starting process, to determine the position of the moving part of the motor without either absolute or incremental position measurement.

What is claimed is:

1. An apparatus for determining an angular position of a rotor of an electric motor, said rotor having a defined number of pole pairs, the apparatus comprising:
    at least one stator winding receiving an electric current with a pulse pattern having a predetermined pulse duration, said electric current causing the rotor to rotate during the pulse duration by no more than 90° divided by the number of pole pairs,
    an acceleration sensor adapted to record an angular acceleration of the rotor caused by the electric current passing through the stator windings, and
    an evaluation unit cooperating with the at least one stator winding and with the acceleration sensor, said evaluation unit determining the angular position of the rotor from a relationship between the electric current and the angular acceleration.

2. The apparatus of claim 1, wherein the acceleration sensor comprises a Ferraris sensor.

3. The apparatus of claim 1, wherein the rotor is implemented as a permanent-magnet rotor.

4. A method for determining an angular position of a rotor of an electric motor, said rotor having a defined number of pole pairs, the method comprising the steps of:
    applying to at least one stator winding of the electric motor an electric current having a predetermined pulse pattern and a predetermined pulse duration, said electric current causing the rotor to rotate during the pulse duration by no more than 90° divided by the number of pole pairs, measuring an angular acceleration of the rotor, and determining the angular position of the rotor from a relationship between the electric current and the angular acceleration.

5. The method of claim 4, wherein the angular acceleration is measured by measuring a variable which only dependent on the angular acceleration, without determination of an incremental rotor position and a speed of the rotor.

6. The method of claim 5, wherein a current-flow pattern includes different sections, wherein the current component has a different mathematical sign in the different section, without causing a permanent change in the angular position.

7. The method of claim 6, wherein a current-flow pattern includes a central section where the current component has a first mathematical sign, and respective edge sections located before and after the central section where the current component has the opposite mathematical sign.

8. The method of claim 7, wherein a magnitude of a maximum current of the current component in the central section is identical to a magnitude of a maximum current in the edge sections.

9. The method of claim 8, wherein the edge sections each have an identical time duration, and wherein this time duration is one half of a time duration of the central section.

10. The method of claim 4, wherein the electric current applied to the at least one stator winding includes a current-flow pattern of linearly independent current components.

11. The method of claim 10, wherein the current components of the pulse pattern have current-flow patterns with a time offset within the predetermined pulse duration.

12. The method of claim 11, wherein the current components flowing through the at least one stator winding include two current components which are mutually orthogonal.

13. The method of claim 12, wherein the current-flow patterns of the two current components are identical.

14. The method of claim 11, wherein a current-flow pattern has a first current-flow phase with a non-zero current component and a second current-flow phase with a zero current component.

15. The method of claim 14, wherein a current-flow phase of one of the current components of the current-flow pattern is located within a zero-current current-flow phase of another current component of the same pulse pattern.

16. The method of claim 10, wherein two current components of the pulse pattern are synchronous, but have different current-flow patterns.

17. The method of claim 4, wherein the rotor rotates by no more than 2° during the pulse duration.

18. The method of claim 4, wherein the rotor is stationary before the angular position is determined.

19. The method of claim 4, wherein the rotor is rotating when the angular position is determined.

20. The method of claim 4, wherein the pulse pattern repeats periodically.

21. The method of claim 4, wherein the pulse pattern comprises a square-wave pulse.

22. The method of claim 4, wherein the pulse pattern has a sinusoidal current profile.

* * * * *